United States Patent Office 3,034,869
Patented May 15, 1962

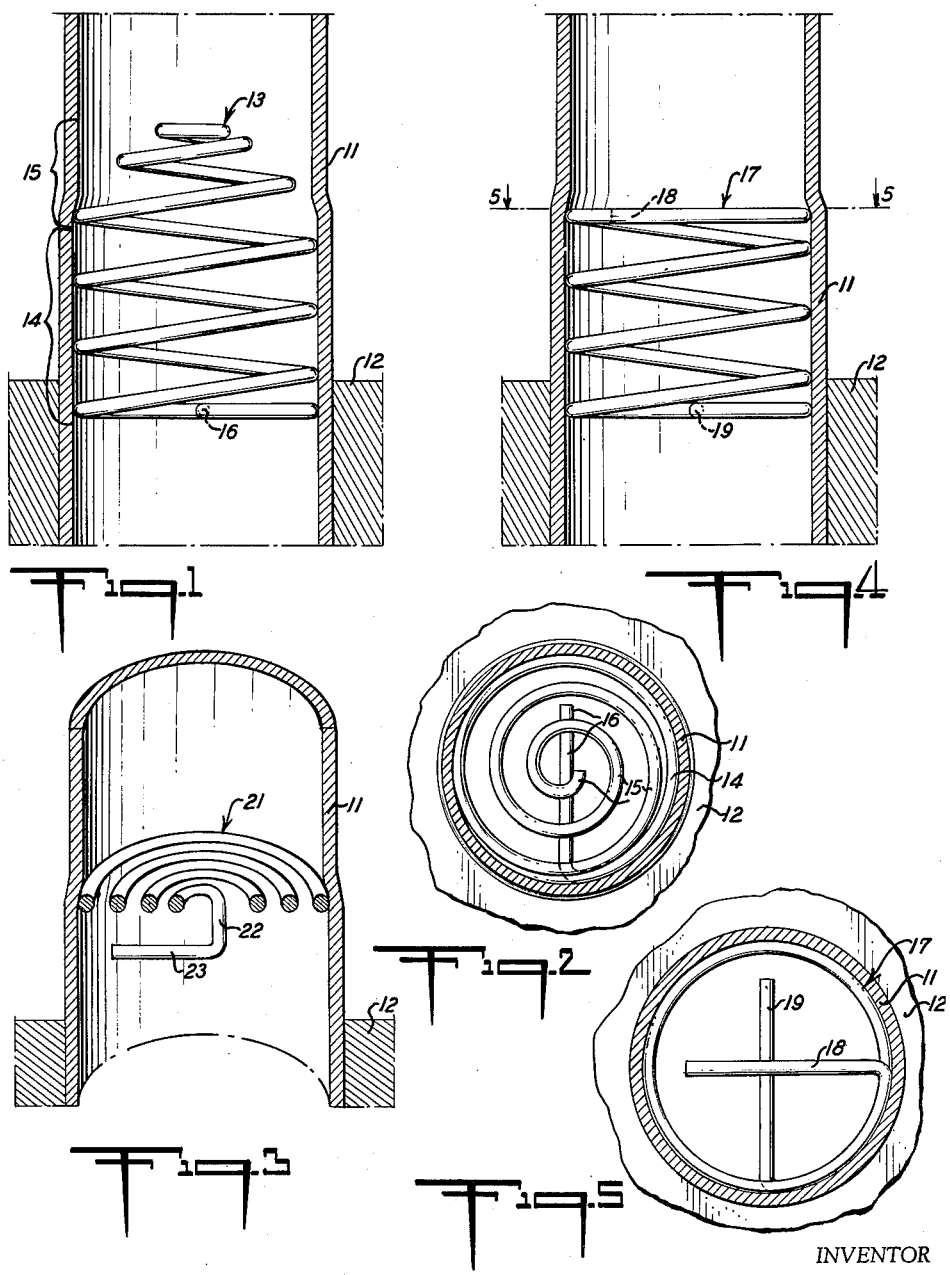

3,034,869
CATALYST RETAINER
Oscar A. Peterson, Westwood, N.J., assignor to Scientific Design Company Inc., New York, N.Y., a corporation of Delaware
Filed May 29, 1958, Ser. No. 738,825
4 Claims. (Cl. 23—288)

This invention relates to a means for retaining solids in reactor tubes while permitting a continuous flow of fluid through the tubes.

The usual procedure in the industrial process of catalysis is to provide units or batteries of tubes. These units or batteries sometimes consist of several thousand tubes each and the tubes are sometimes as long as twenty feet. The tubes are usually filled or loaded with particles of the catalyst used in the process and a liquid or gas stream is passed through the tubes under pressure, permitting a chemical reaction to take place within the tubes while the liquid or gas is in contact with the catalyst. Usually a perforated rigid metal body is inserted into each end of the reactor tube, the perforated rigid metal body being hammered into the tube with a mallet. Since the catalyst in the tubes may be changed at intervals of as short as six months or less, the perforated rigid metal bodies, which serve as catalyst retainers, may be inserted and removed from the tubes at fairly frequent intervals.

It has been found, moreover, that when the particles of catalyst are loaded into the tube the first particles falling into the tube are often broken by the weight of the particles above them when they hit the rigid body at the bottom of the tube. Furthermore, it has been found that the rigid metal bodies previously used had a relatively high unit price.

Furthermore, it has been found that the rigid metal body, even with large perforations, will sometimes cause a substantial pressure drop in the fluid flowing through the tube.

It is the object of the present invention to provide a device which will function as a catalyst retainer and which will be easy to insert and to remove.

Another object of the present invention is to provide such a device which will not cause any substantial pressure drop in the fluid flowing through the tubes.

A still further object of the present invention is to provide such a device which provides a cushioning effect when particles of catalyst are loaded into the reactor tubes, thereby substantially decreasing the breakage of catalyst particles.

A still further object of the present invention is to provide such a device which will be substantially less expensive than the rigid metal bodies conveniently used. The device described herein has a unit price of approximately one hundredth or less than that of the previously used retainers, thereby obviously effecting a substantial saving in cost.

These objects of the invention will become apparent from the accompanying drawings, in which:

FIGURE 1 shows, positioned in a tube, a spiral coil spring having its top portion of conical shape.

FIGURE 2 is a top plan view of FIGURE 1.

FIGURE 3 shows a flat coil spring positioned in a tube.

FIGURE 4 shows a spiral coil spring of cylindrical shape positioned in a tube.

FIGURE 5 shows a sectional view taken along the line 5—5 in FIGURE 4.

The present invention comprises, in combination, a tube and a means for retaining solids therein, said means comprising an elastic body capable of retaining itself and said solids in said tube and also being adapted to allow a free flow of fluids through said tube, said elastic body being chemically inert to said fluids.

Another embodiment of the present invention comprises, in combination, a tube and a means for retaining therein particles approximately one-half the diameter of said tube, said means comprising an elastic body being adapted to retain itself and said particles in said tube and also being adapted to allow a free flow of fluids through said tube, said elastic body being chemically inert to said fluids.

Still another embodiment of the present invention comprises, in combination, a tube and a means for retaining therein particles approximately one-half the diameter of said tube, said means comprising a spiral spring being adapted to retain itself and said particles in said tube and also being adapted to allow a free flow of fluids through said tube, said spring being chemically inert to said fluids.

A further embodiment of the present invention comprises, in combination, a series of vertical catalytic reactor tubes for containing catalyst used in the manufacture of ethylene oxide and a means for retaining in said tubes particles of ethylene oxide catalyst approximately one-half the diameter of said tubes, said means comprising a spiral coil spring for each tube, said springs being adapted to retain themselves and said particles in said tubes and also capable of allowing a free flow of vapor containing ethylene through said tubes, said springs being chemically inert to said vapor.

Still another embodiment of the present invention comprises, in combination, a series of vertical catalytic reactor tubes for containing catalyst used in the manufacture of ethylene oxide and a means for retaining in said tubes particles of ethylene oxide catalyst approximately one-half the diameter of said tubes, said means comprising spiral coil springs being adapted to retain themselves and said particles when positioned vertically in said tubes with the longitudinal axis of said springs being coincident to the longitudinal axis of said tubes and also being adapted to allow a free flow of vapor containing ethylene through said tubes, said springs being chemically inert to said vapor and having both ends bent in such manner that the ends of said springs are straight and pass through the center of the circle formed by a horizontal cross-section of said tube.

Still another embodiment of the present invention comprises, in combination, a series of vertical catalytic reactor tubes for containing catalyst used in the manufacture of ethylene oxide and a means for retaining in said tubes particles of ethylene oxide catalyst approximately one-half the diameter of said tubes, said means comprising spiral coil springs being adapted to retain themselves and said particles when positioned vertically in said tubes with the longitudinal axis of said springs being coincident to the longitudinal axis of said tubes and also being adapted to allow a free flow of vapor containing ethylene through said tubes, each of said springs being chemically inert to said vapor and having the shape of a conical helix having the end at the base of the cone bent in such manner that said end of said spring is straight and passes through the center of the circle formed by a horizontal cross-section of said tube.

Referring to FIGURES 1 and 2, there is shown a tube 11 in a fragment of tube sheet 12. A spiral coil spring 13 is shown in place in tube 11. The bottom portion 14 of spring 13 is cylindrical, while the upper portion 15 is of conical shape. This allows excellent contact between the tube wall and the spring, giving good retention characteristics for support of catalyst in the tube. The upper portion 15 of the spring 13 is conical and capable of compression, yielding maximum cushioning effect under load, as when catalyst particles are dropped into the tube from the upper end. The straight bottom end 16 of the spring 13 is capable of being grasped by the thumb and forefinger of one hand or by an appropriate tool having a slit in the end so that the spring 13 may be twisted, thus reducing its diameter and facilitating its insertion into or removal from the tube 11.

Referring to FIGURE 3, there is shown a tube 11 in a fragment of tube sheet 12. A flat coil spring 21 is shown in place in tube 11. The center of the coil spring 21 ends in a member 22, projecting downward vertically from the center of the flat coil spring 21 and across the tube horizontally. The horizontal part 23 of member 22 may be grasped with the thumb and forefinger of one hand or with an appropriate tool having a slit in the end and twisted, thus decreasing the diameter of the flat coil spring 21 and allowing easy insertion into or removal from the tube 11. An advantage of this embodiment is that it can be adapted to retain relatively small particles of catalyst in the tube 11 and also provides a cushioning effect yielding compression under load, as when catalyst particles are dropped into the tube from the upper end.

FIGURES 4 and 5 show another embodiment of the present invention wherein tube 11 is in a fragment of tube sheet 12. A spiral coil spring of cylindrical shape 17 is shown in place in tube 11. The top 18 and the bottom 19 of the cylindrical coil spring 17 are straight, thus facilitating the insertion into or removal from the tube 11 of the coil spring 17 by the thumb and forefinger of one hand or the use of an appropriate tool with a slit in the end. This allows excellent contact between the tube wall and the spring, giving good retention characteristics for support of catalyst in the tube, and provides a cushioning effect yielding compression under load. This embodiment is particularly useful where the particles of catalyst are of a diameter greater than half the diameter of the tube. A further advantage of this embodiment is that the spiral coil spring 17 may be inserted in the tube in either direction, since the top and the bottom are similar in shape.

Variations and modifications of the invention will be apparent to one skilled in the art in view of the foregoing disclosures, and it is intended to include within the invention all such variations and modifications except as do not come within the scope of the appended claims.

What is claimed is:

1. In combination, a catalytic reactor tube; catalyst particles located therein; and a compressible helical spring having at at least one end a catalyst particle retaining means; said retaining means being inwardly directed and adapted to prevent the passage of catalyst particles therethrough, and being interposed between said catalyst particles and said helical spring; said helical spring having a plurality of convolutions in continuous circumferential contact with the inner wall of said tube near a tube extremity and exerting a radially directed force against the inner wall of said tube, said radially directed force providing the sole means of catalyst support spring retention in the said tube.

2. The combination according to claim 1 wherein the catalyst particle retaining means is at least one convolution of diminishing diameter.

3. The combination of claim 1 wherein said catalyst particle retaining means is a straight radially inwardly directed portion.

4. In combination, a catalytic reactor tube, catalyst particles located therein and a compressible helical spring having at one end a catalyst retaining means; said retaining means being inwardly directed and adapted to prevent the passage of catalyst particles therethrough, and being interposed between said catalyst particles and said helical spring; said helical spring having a plurality of convolutions in continuous circumferential contact with the inner wall of said tube near a tube extremity and exerting radially directed force against the inner wall of said tube, said radially directed force providing the sole means of catalyst support spring retention in the said tube, and said helical spring having an other end extending radially inwardly to facilitate the removal of said spring from said tube.

References Cited in the file of this patent
UNITED STATES PATENTS

| | | |
|---|---|---|
| 1,387,003 | Hedges | Aug. 9, 1921 |
| 1,701,607 | Brinton | Feb. 12, 1929 |
| 1,809,114 | Gillett | June 9, 1931 |
| 2,042,922 | Beardsley | June 2, 1936 |